US012476358B2

(12) United States Patent
Lee et al.

(10) Patent No.: US 12,476,358 B2
(45) Date of Patent: Nov. 18, 2025

(54) ANTENNA AND ELECTRONIC DEVICE INCLUDING SAME

(71) Applicant: SAMSUNG ELECTRONICS CO., LTD., Suwon-si (KR)

(72) Inventors: Seokwoo Lee, Suwon-si (KR); Hyosung Kang, Suwon-si (KR); Dongryul Shin, Suwon-si (KR); Jiwoo Lee, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 368 days.

(21) Appl. No.: 17/972,551

(22) Filed: Oct. 24, 2022

(65) Prior Publication Data

US 2023/0105261 A1 Apr. 6, 2023

Related U.S. Application Data

(63) Continuation of application No. PCT/KR2022/013385, filed on Sep. 6, 2022.

(30) Foreign Application Priority Data

Oct. 1, 2021 (KR) ........................ 10-2021-0130721

(51) Int. Cl.
*H01Q 3/24* (2006.01)
*H01Q 1/38* (2006.01)
*H01Q 13/16* (2006.01)

(52) U.S. Cl.
CPC ................. *H01Q 3/24* (2013.01); *H01Q 1/38* (2013.01); *H01Q 13/16* (2013.01)

(58) Field of Classification Search
CPC ............. H01Q 3/24; H01Q 1/38; H01Q 13/16
See application file for complete search history.

(56) References Cited

U.S. PATENT DOCUMENTS 10,939,539 B2 3/2021 Seo et al.
11,114,741 B2 9/2021 Moon et al.
(Continued)

FOREIGN PATENT DOCUMENTS

JP 2008244581 A 10/2008
KR 20200022161 A 3/2020
(Continued)

OTHER PUBLICATIONS

Extended European Search Report corresponding to Application No. 22876706.7-1201; Dated Jul. 24, 2024.
(Continued)

*Primary Examiner* — Graham P Smith
(74) *Attorney, Agent, or Firm* — CANTOR COLBURN LLP

(57) ABSTRACT

An electronic device includes a housing, and an antenna structure disposed in the inner space of the housing. The antenna structure includes a substrate including a first surface, a second surface facing away from the first surface, and side surfaces surrounding a space between the first surface and the second surface. At least one antenna element is disposed to form a beam pattern in a direction in which the first surface is oriented, and at least one bracket is disposed in the inner space and configured to support the substrate such that the first surface is tilted to a predetermined angle with respect to a first direction. A wireless communication circuit is disposed in the inner space and is configured to form, via the at least one antenna element, the beam pattern in the direction in which the first surface is oriented.

16 Claims, 16 Drawing Sheets

(56) References Cited

U.S. PATENT DOCUMENTS

| | | | |
|---|---|---|---|
| 11,283,180 B2 | 3/2022 | Kim et al. | |
| 11,349,207 B2 | 5/2022 | Kim et al. | |
| 2020/0266520 A1 | 8/2020 | Moon et al. | |
| 2020/0287268 A1 | 9/2020 | Moon et al. | |
| 2020/0329549 A1 | 10/2020 | Seo et al. | |
| 2020/0365972 A1 | 11/2020 | Jeon et al. | |
| 2021/0083366 A1 | 3/2021 | Moon et al. | |
| 2021/0210869 A1 | 7/2021 | Lee et al. | |
| 2021/0280971 A1* | 9/2021 | Kim | H01Q 1/243 |
| 2021/0280981 A1 | 9/2021 | Kim et al. | |

FOREIGN PATENT DOCUMENTS

| | | |
|---|---|---|
| KR | 20200101256 A | 8/2020 |
| KR | 20200121037 A | 10/2020 |
| KR | 20200131775 A | 11/2020 |
| KR | 20210015559 A | 2/2021 |

OTHER PUBLICATIONS

International Search Report with Written Opinion issued in International Application No. PCT/KR2022/013385; International Filing Date Sep. 6, 2022; Date of Mailing Dec. 16, 2022 (9 pages).

Korean Office Action corresponding to Application No. 119981042713; Dated Sep. 26, 2025.

* cited by examiner

ANTENNA AND ELECTRONIC DEVICE INCLUDING SAME

CROSS-REFERENCE TO RELATED APPLICATION(S)

This application is a continuation of International Application No. PCT/KR2022/013385, filed on Sep. 6, 2022, which claims priority to Korean Patent Application No. 10-2021-0130721, filed on Oct. 1, 2021 in the Korean Intellectual Property Office, the disclosures of which are herein incorporated by reference.

TECHNICAL FIELD

Various embodiments of the disclosure relate to an antenna and an electronic device including the same.

BACKGROUND ART

With the development of wireless communication technology, electronic devices (e.g., electronic devices for communication) are commonly used in daily life, and thus use of contents is increasing exponentially. Due to the rapid increase of use of contents, network capacity is gradually reaching the limit thereof. After the commercialization of 4G (4th generation) communication systems, in order to meet the increasing demand for wireless data traffic, next-generation communication systems (e.g., a 5G (5th generation) communication system, a pre-5G communication system, or a new radio (NR)) that transmit and/or receive signals using a frequency of a high-frequency (e.g., the mmWave) band (e.g., a band in the range of 3 GHz to 300 GHz)) are being researched.

DISCLOSURE

Technical Problem

The next-generation wireless communication technology can transmit and receive wireless signals using a frequency substantially in the range of about 3 GHz to 300 GHz. New antenna structures (e.g., an antenna module) are being developed in order to overcome high free-space loss due to frequency characteristics and to increase the gain of an antenna. The antenna structure may include a plurality of antenna elements (e.g., conductive patches or conductive patterns) disposed in an array at a predetermined interval. These antenna elements may be disposed to form a beam pattern in any one direction inside the electronic device. For example, the antenna structure may be disposed to form a beam pattern toward at least a portion of the front surface, the rear surface, and/or the side surface in the inner space of the electronic device.

An electronic device such as a notebook PC or a tablet PC used while being placed on a placement surface (e.g., a desk) may include at least one antenna structure that may be tilted to a predetermined angle from the placement surface when manipulating the electronic device. For example, an antenna structure having a predetermined beam width may be disposed to be tilted to a predetermined angle from the placement surface, which may be helpful for the improvement of radiation performance in the lateral direction and the upward direction of the electronic device.

However, when the antenna structure is inclined only with the structure of the housing itself of the electronic device, it may be difficult to set a desired tilting angle due to a mold error. In addition, it is necessary to consider connectivity with the device substrate disposed inside the housing.

Technical Solution

Various embodiments of the disclosure are able to provide an antenna with improved assembly and an electronic device including the same.

Various embodiments are further able to provide an antenna capable of helping to secure radiation performance via an optimal tilting structure and an electronic device including the same.

Various embodiments are also to provide an antenna having an efficient arrangement structure with other electronic components and an electronic device including the same.

It should be appreciated that the problems to be solved in the disclosure are not limited to the above-mentioned problems, and may be variously expanded without departing from the spirit and scope of the disclosure.

According to various embodiments, an electronic device may include: a housing; an antenna structure disposed in the inner space of the housing, the antenna structure including a substrate including a first surface, a second surface facing away from the first surface, and side surfaces surrounding the space between the first surface and the second surface, and at least one antenna element disposed on the substrate such that a beam pattern is provided in a direction in which the first surface is oriented; at least one bracket disposed in the inner space and configured to support the substrate such that the first surface is tilted to a predetermined angle with respect to a first direction; and a wireless communication circuit disposed in the inner space and configured to form, via the at least one antenna element, the beam pattern in the direction in which the first surface is oriented.

According to various embodiments, an electronic device may include: a housing including a first plate oriented in a first direction a second plate oriented in a second direction opposite to the first plate, and a side member surrounding the inner space between the first plate and the second plate and oriented in a third direction perpendicular to the first direction; an antenna structure disposed in the inner space and including a substrate including a first surface, a second surface facing away from the first surface, and a side surface surrounding the space between the first surface and the second surface, and at least one antenna element disposed to form a beam pattern in a direction in which the first surface is oriented; a conductive support bracket disposed in the inner space via the first plate and configured to support the substrate such that the first surface is tilted to a predetermined angle between the first direction and the third direction; a mold bracket disposed between the conductive support bracket and the first plate and configured to fix the conductive support bracket; and a wireless communication circuit disposed in the inner space and configured to transmit or receive a wireless signal of a predetermined frequency band via the at least one antenna element.

Advantageous Effects

In the electronic device according to an exemplary embodiment of the disclosure, a tilting angle is implemented via the structure of at least one bracket itself, which supports an antenna structure. Thus, even if the bracket is horizontally disposed in the housing, more accurate tilting of the antenna is possible, which may be helpful for the improvement of assemblability.

In addition, various effects directly or indirectly identified through the disclosure may be provided.

DESCRIPTION OF DRAWINGS

In connection with the description of the drawings, the same or similar components may be denoted by the same or similar reference numerals.

MODE FOR INVENTION

Figure 1:
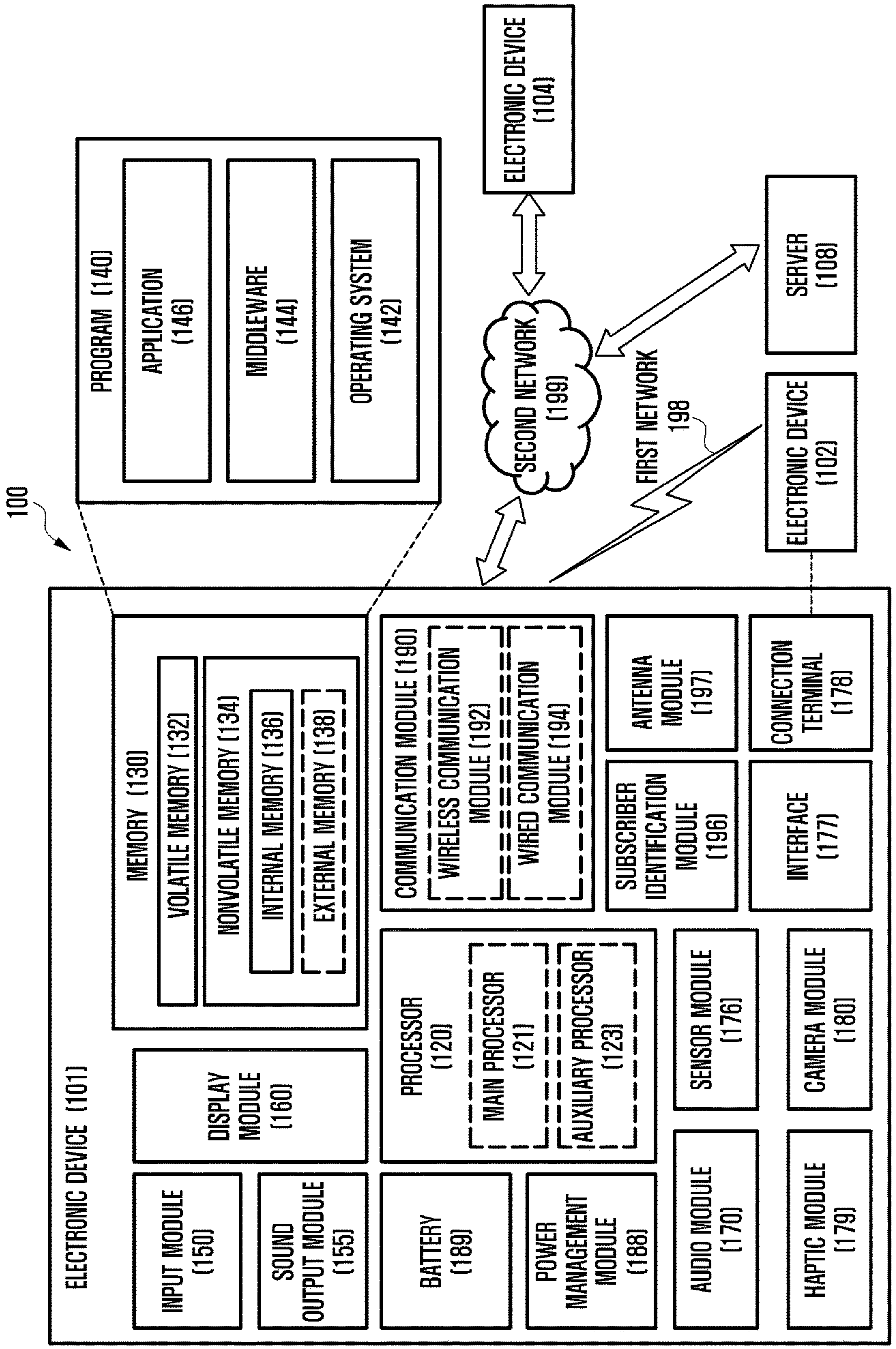
FIG. 1 is a block diagram of an electronic device according to various embodiments of the disclosure in a network environment.

FIG. 1 is a block diagram illustrating an example electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, an audio output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In various embodiments, at least one (e.g., the display device 160 or the camera module 180) of the components may be omitted from the electronic device 101, or one or more other components may be added in the electronic device 101. In various embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may further include an internal memory 136 and an external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The audio output device 155 may output sound signals to the outside of the electronic device 101. The audio output device 155 may include, for example, a speaker or a receiver. The speaker may be used for general purposes, such as playing multimedia or playing record, and the receiver may be used for an incoming calls. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the audio output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

A connection terminal 178 may include a connector via which the electronic device 101 may be physically connected with the external electronic device (e.g., the electronic device 102). The connection terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas.

The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
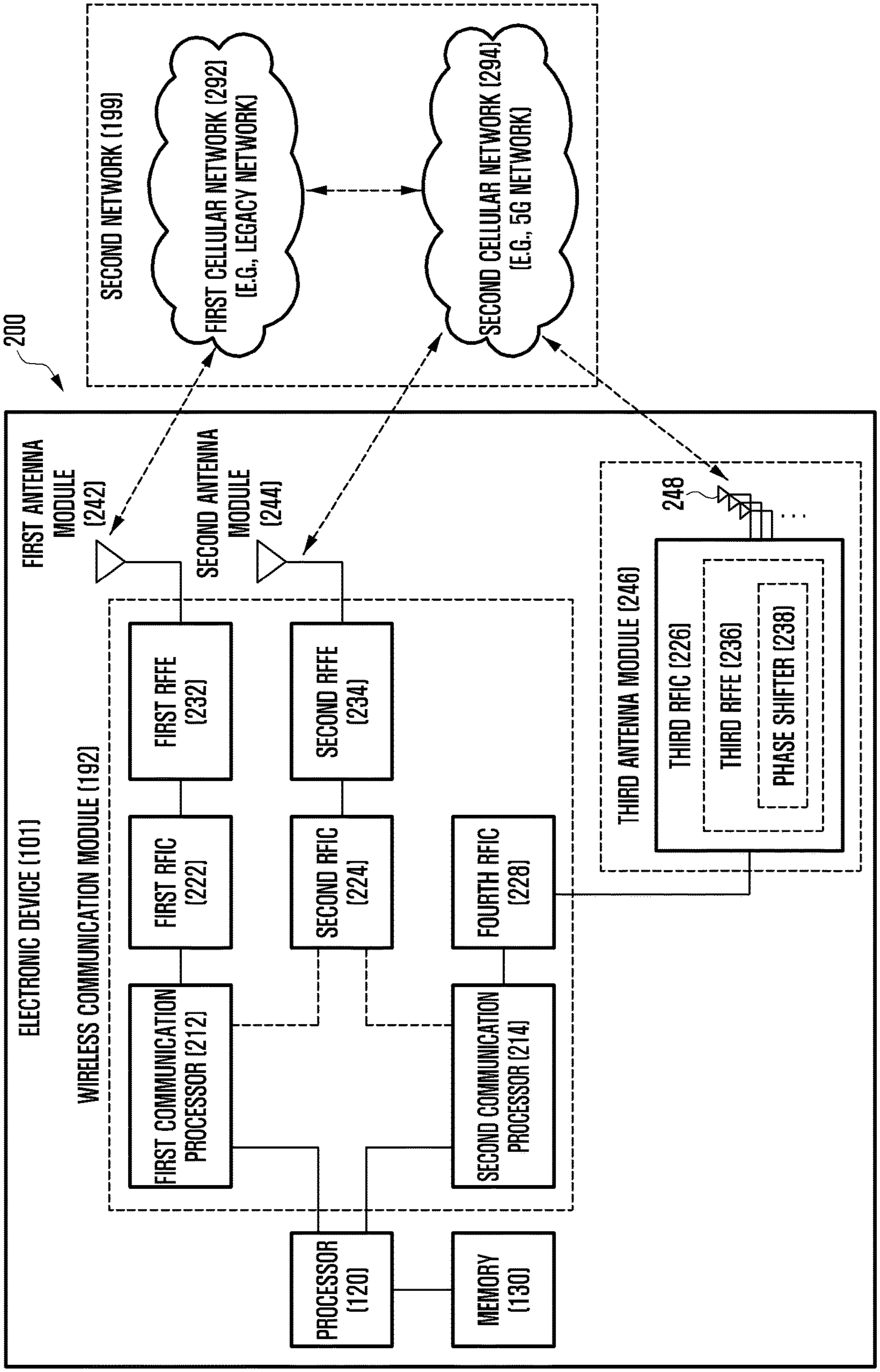
FIG. 2 is a block diagram of an electronic device configured to support a legacy network communication and a 5G network communication, according to various embodiments of the disclosure.

FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support 5G network communication through the established communication channel. According to various embodiments, the second cellular network 294 may be a 5G network defined in 3GPP. Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292

(e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226. The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., stand-alone (SA)) independently of the first cellular network 292 (e.g., legacy network) or may be operated (e.g., non-standalone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
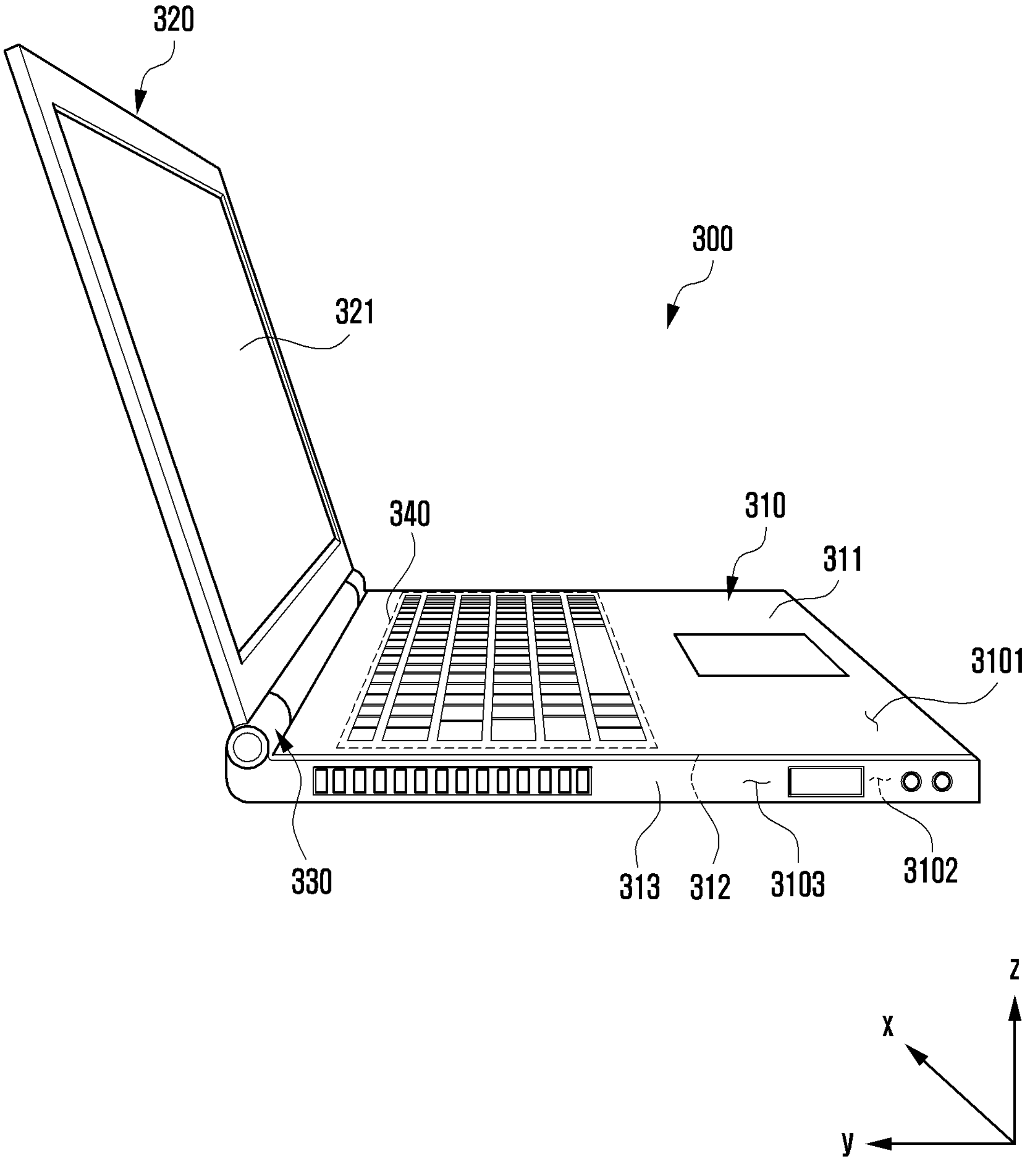
FIG. 3 is a perspective view illustrating the electronic device according to various embodiments of the disclosure.
Figure 4:
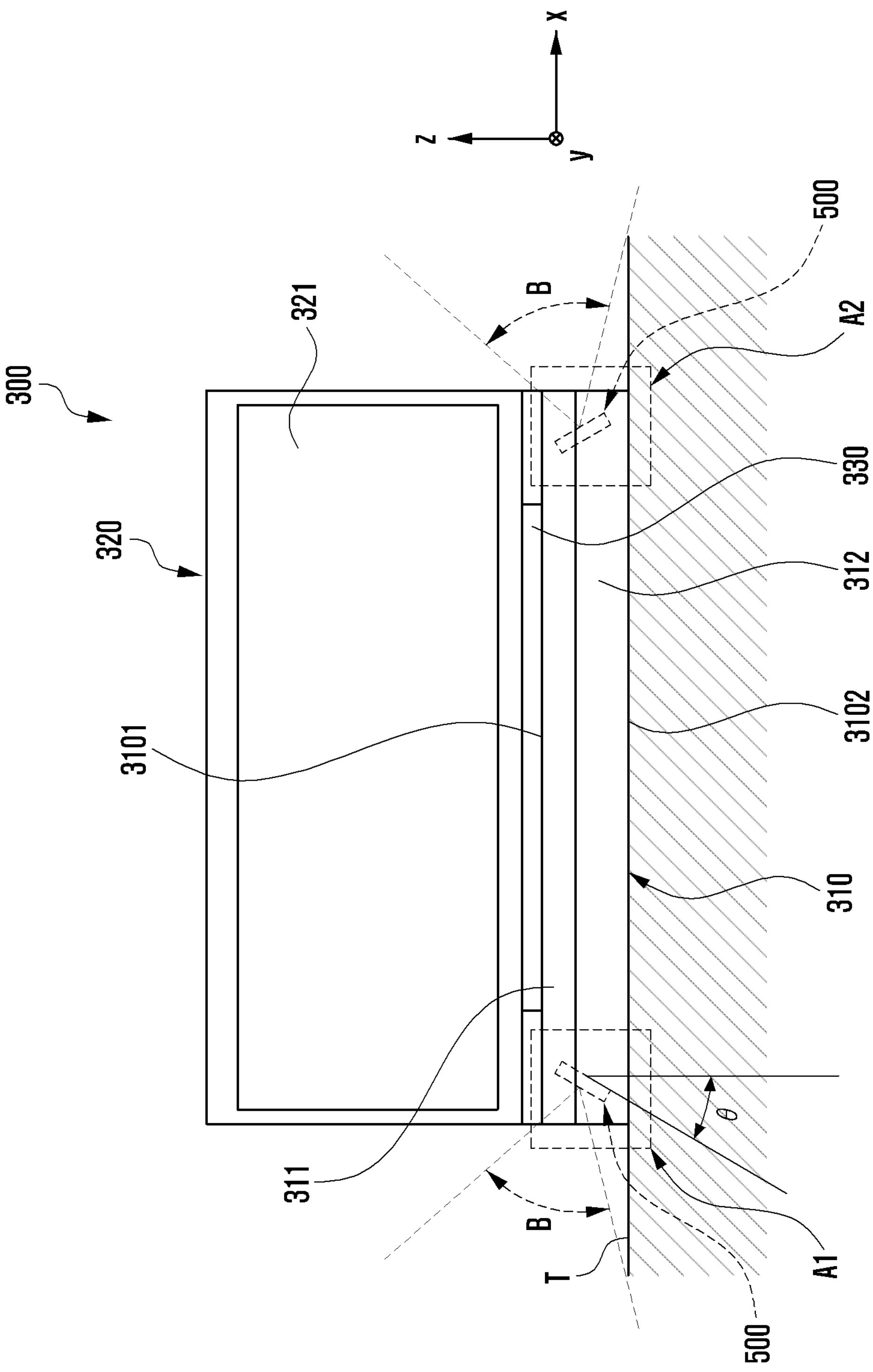
FIG. 4 is a view schematically illustrating a state in which an antenna structure is disposed in an electronic device according to various embodiments of the disclosure.

FIG. 3 is a perspective view illustrating the electronic device according to various embodiments of the disclosure. FIG. 4 is a front view schematically illustrating a state in which an antenna structure is disposed in an electronic device according to various embodiments of the disclosure.

The electronic device 300 of FIG. 3 may be at least partially similar to the electronic device 101 of FIG. 1 or may further include other embodiments of an electronic device.

Referring to FIGS. 3 and 4, the electronic device 300 may include a first housing 310 and a second housing 320 that is foldably connected to the first housing 310 via a hinge device 330. According to an embodiment, the electronic device 300 may include a notebook PC that is capable of being mounted on a placement surface T of a placement structure (e.g., a desk or table). In some embodiments, the electronic device 300 may be replaced with a tablet PC or a portable electronic device (e.g., a mobile terminal) including a single housing 310. According to an embodiment, the second housing 320 may be unfolded in a predetermined angular range (e.g., in a range of about 0 degrees to 360 degrees) with respect to the first housing 310. According to an embodiment, the second housing 320 may be folded to face at least a portion of the first housing 310.

According to various embodiments, the first housing 310 may include: a first plate 311 oriented in a first direction (e.g., the z-axis direction) and defining at least a portion of the front surface 3101 of the first housing; a second plate 312 oriented in a second direction (e.g., the −z-axis direction) opposite to the first direction (e.g., the z-axis direction) and a second plate 312 and defining at least a portion of the rear surface 3102; and a side member 313 (e.g., the side bezel) surrounding the space (e.g., the inner space 3001 in FIG. 7) between the first plate 311 and the second plate 312, oriented in a third direction (e.g., the x-axis direction) perpendicular to the first direction (e.g., the z-axis direction), and defining the side surface 3103. In some embodiments, at least a portion of the side member 313 may extend from the first plate 311 and/or the second plate 312. In some embodiments, the first plate 311, the second plate 312, and the side member 313 may be integrally formed. According to an embodiment, the electronic device 300 may include a key button assembly 340 including a plurality of key buttons disposed in the first housing 310 to be exposed to the outside through the first plate 311. According to an embodiment, the second housing 320 may include a display 321. In some embodiments, at least one of the plurality of key buttons of the key button assembly 340 may be disposed to be exposed to the outside from the side surface 3103 and/or the rear surface 3102.

Figure 7:
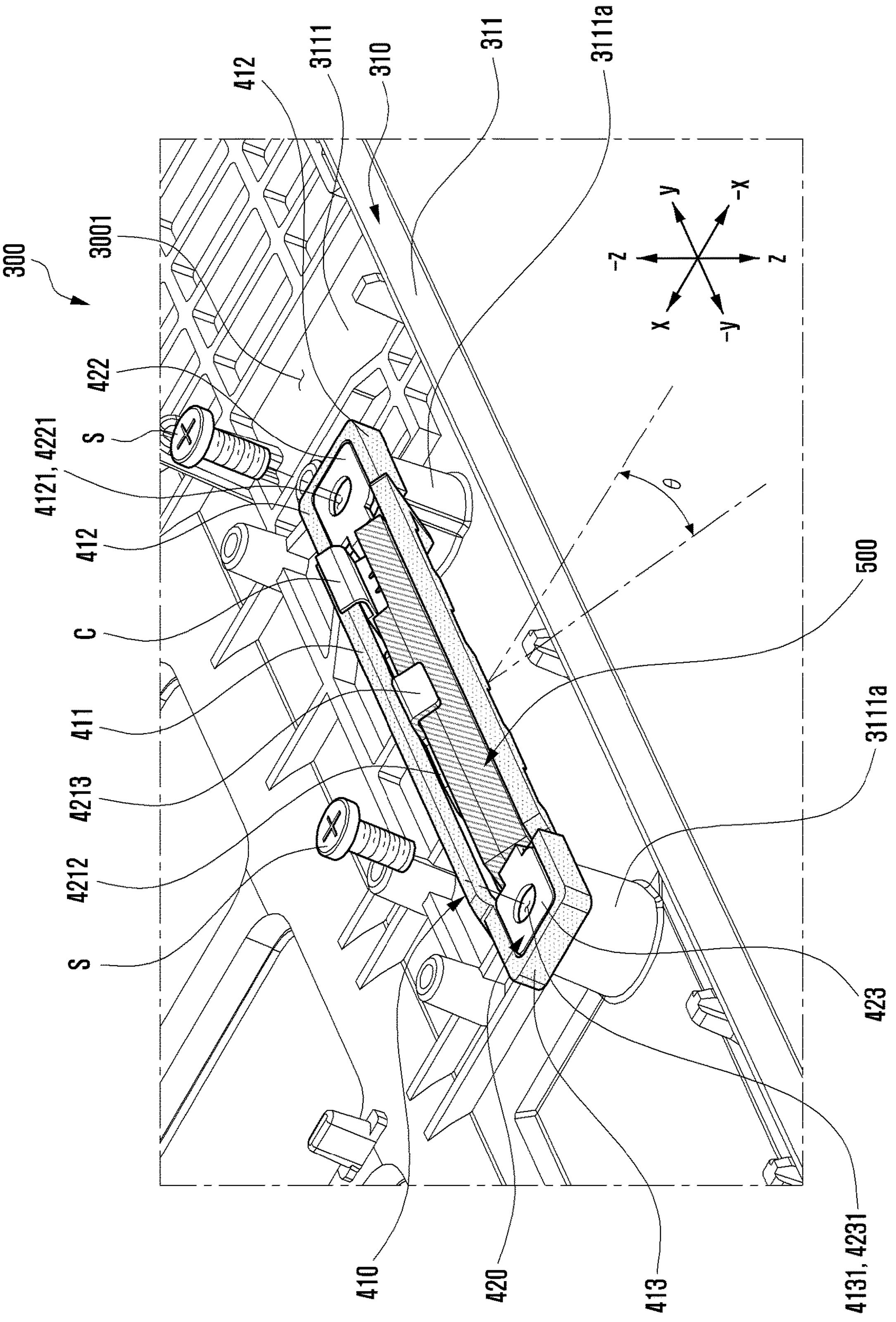
FIG. 7 is a perspective view illustrating a state in which the mold bracket on which a support bracket including an antenna structure according to various embodiments of the disclosure is mounted is disposed and partially coupled in a housing.

According to various embodiments, the electronic device 300 may include at least one antenna structure 500 disposed in the inner space (e.g., the inner space 3001 in FIG. 7). According to an embodiment, the at least one antenna structure 500 may be disposed, in an area (area A1) adjacent to one of the sides of the first housing 310, and/or an area (area A2) adjacent to an opposing side of the first housing 310 in the inner space 3001 of the electronic device 300. According to an embodiment, the at least one antenna structure 500 has a beam width B of a predetermined angle (e.g., about 120 degrees), and may be disposed to form a beam pattern in a third direction (e.g., the x-axis direction) and a first direction (e.g., the z-axis direction). For example, in the antenna structure 500, when the radiation surface of the beam pattern is arranged in parallel with the side surface 3103 (in the case of vertical mounting), a portion of the beam width B may be directed toward an unnecessary placement surface T. This may result in a decrease in radiation efficiency, so an additional antenna structure oriented in the first direction (the z-axis direction) may be further required.

The electronic device 300 according to an exemplary embodiment of the disclosure includes a structure for disposing the antenna structure 500 tilted to a predetermined angle θ such that the radiating surface thereof is directed to a space between a first direction (e.g., the z-axis direction) and a third direction (e.g., the x-axis direction). Thus, the radiation performance of the antenna structure 500 may be improved by efficiently setting the beam width with the single antenna structure 500. In addition, the electronic device 300 according to exemplary embodiments of the disclosure is capable of providing improved assemblability that enables the radiation surface of the antenna structure 500 to be tilted to the predetermined angle θ only by an assembly process of fixing the antenna structure to the housing 310 via at least one bracket, as described herein.

Figure 5:
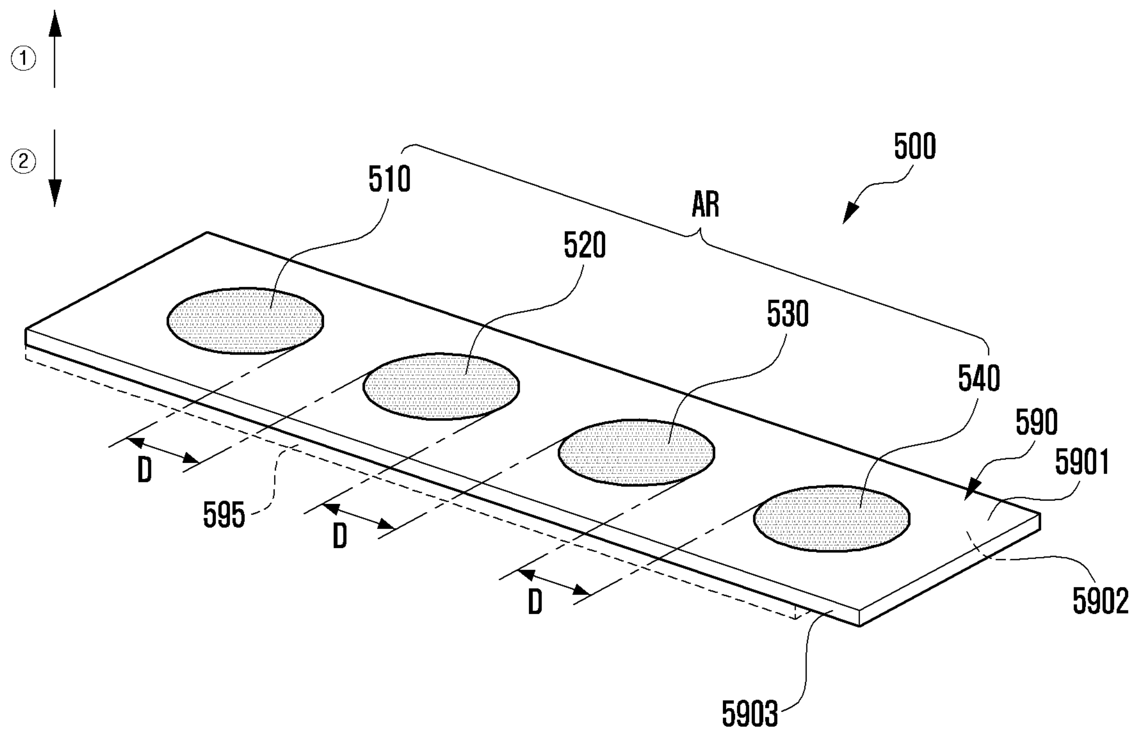
FIG. 5 is a perspective view of an antenna structure according to various embodiments of the disclosure.

FIG. 5 is a perspective view of an antenna structure according to various embodiments of the disclosure.

The antenna structure 500 of FIG. 5 may be at least partially similar to the third antenna module 246 of FIG. 2, or may further include other embodiments.

Referring to FIG. 5, an antenna structure 500 (e.g., an antenna module) may include a substrate 590 (e.g., a printed circuit board) and a plurality of antenna elements 510, 520, 530, and 540 disposed on the substrate 590 as an array antenna (AR). According to an embodiment, the substrate 590 may include a first surface 5901 oriented in a predetermined direction (e.g., the direction ①), a second surface 5902 oriented in a direction (e.g., the direction ②) opposite to the first surface 5901, and side surfaces 5903 surrounding the space between the first surface 5901 and the second surface 5902. According to an embodiment, the plurality of antenna elements 510, 520, 530, and 540 may be disposed to be exposed to the first surface 5901, or may be disposed between the first surface 5901 and the second surface 5902 at a position closer to the first surface 5901 to form a beam pattern in a direction in which the first surface 5901 is oriented (e.g., the direction ①). According to an embodiment, the plurality of antenna elements 510, 520, 530, and 540 may include a plurality of conductive patches and/or a plurality of conductive patterns disposed on the substrate 590.

According to various embodiments, the antenna structure 500 may include a wireless communication circuit 595 disposed on the second surface 5902 of the substrate 590 and electrically connected to the plurality of antenna elements 510, 520, 530, and 540. According to an embodiment, the wireless communication circuit 595 may be configured to transmit and/or receive a wireless frequency in the range of about 3 GHz to about 300 GHz via the array antenna AR. In some embodiments, the wireless communication circuit 595 may be disposed in the inner space (e.g., the inner space 3001 in FIG. 7) of the electronic device (e.g., the electronic device 300 in FIG. 7) at a position spaced apart from the substrate 590 and may be electrically connected to the substrate 590 via an electrical connection member (e.g., a flexible RF cable (FRC)).

According to various embodiments, the wireless communication circuit 595 electrically connected to the plurality of antenna elements 510, 520, 530, and 540 may include RFICs (e.g., the RFICs 222, 224, 226, and/or 228 of FIG. 2). For example, the plurality of antenna elements 510, 520, 530, and 540 may be disposed on one surface (e.g., the first surface 5901) of the substrate 590, and the RFICs (e.g., the RFICs 222, 224, 226, and/or 228 in FIG. 2) may be disposed on the other surface (e.g., the second surface 5902) of the substrate 590.

According to various embodiments, the plurality of antenna elements 510, 520, 530, and 540 may include a first antenna element 510, a second antenna element 520, a third antenna element 530, or a fourth antenna element 540 spaced apart from each other by a predetermined interval D. According to an embodiment, the plurality of antenna elements 510, 520, 530, and 540 may be arranged in a row. It should be appreciated, however, that other arrangements of the antenna elements 510, 520, 530, and 540 can be implemented without departing from the scope of the present disclosure. In some embodiments, the plurality of antenna elements 510, 520, 530, and 540 may be arranged to have a matrix form (e.g., a matrix form of 2×2). According to an embodiment, the plurality of antenna elements 510, 520, 530, and 540 may have substantially the same shape. In some embodiments, the antenna structure 500 may include, but not excessively, an antenna array AR including four antenna elements 510, 520, 530, and 540. For example, the antenna structure 500 may include one antenna element, and may include two, three, or five or more antenna elements as an antenna array AR. In some embodiments, the antenna structure 500 may further include a plurality of conductive patterns (e.g., a dipole antenna) arranged on the substrate 590. In some embodiments, the plurality of conductive patterns (e.g., a dipole antenna) may be disposed in the substrate 590 including a plurality of insulating layers on the insulating layer that is the same as or different from that of the plurality of antenna elements 510, 520, 530, 540. In some embodiments, the plurality of conductive patterns (e.g., a dipole antenna) may be disposed in an area that does not overlap the plurality of antenna elements 510, 520, 530, and 540 when the first surface 5901 is viewed from above. In this case, a ground layer may not be disposed in a corresponding area of the substrate 590 in which the plurality of conductive patterns are disposed. In some embodiments, the plurality of conductive patterns (e.g., a dipole antenna) may be disposed inside of the substrate 590, and the plurality of antenna elements 510, 520, 530, and 540 may be disposed to be exposed on an outer surface (e.g., the first surface 5901) of the substrate 590. In this case, the conductive patterns may be disposed such that the beam pattern formed via the conductive patterns is formed in a direction different from (e.g., a direction perpendicular to) the direction of the beam pattern formed by the array antenna AR.

According to various embodiments, the intervals D at which the plurality of antenna elements 510, 520, 530, and 540 are arranged may be, for example, about 1 mm to about 10 mm. According to an embodiment, the intervals D at which the plurality of antenna elements 510, 520, 530, and 540 are arranged may be smaller than the lengths (e.g., diameter) of the antenna elements. For example, the intervals D at which the plurality of antenna elements 510, 520, 530, and 540 are arranged may be smaller than the shortest width of unit antenna elements. In some embodiments, the intervals D at which the plurality of respective antenna elements 510, 520, 530, and 540 are arranged may be determined by an operating frequency band of the array antenna AR.

According to various embodiments, the substrate 590 of the antenna structure 500 may be disposed in the inner space (e.g., the inner space 3001 in FIG. 7) of the electronic device (e.g., the electronic device 300 in FIG. 7) such that the first surface 5901 is tilted to a predetermined angle (e.g., the predetermined angle θ in FIG. 4) to face the space between the first direction (e.g., the z-axis direction in FIG. 4) in which the first plate (e.g., the first plate 311 in FIG. 4) is oriented and the third direction (e.g., the x-axis direction in FIG. 4) in which the side member (e.g., the side member 313 in FIG. 4) is oriented. Through the tilting arrangement of the substrate 590, the antenna structure 500 may move a part of the beam pattern, which 5 has been directed to the placement surface (e.g., the placement surface T in FIG. 4), to the third direction (e.g., the x-axis direction in FIG. 4) in which the side surface (e.g., 3103 in FIG. 4) may oriented, so that the entire beam width is moved to the third direction (e.g., the x-axis direction in FIG. 4) and the first direction (e.g., the z-axis direction in FIG. 4), thereby improving the radiation performance of the antenna structure 500.

Figure 6A:
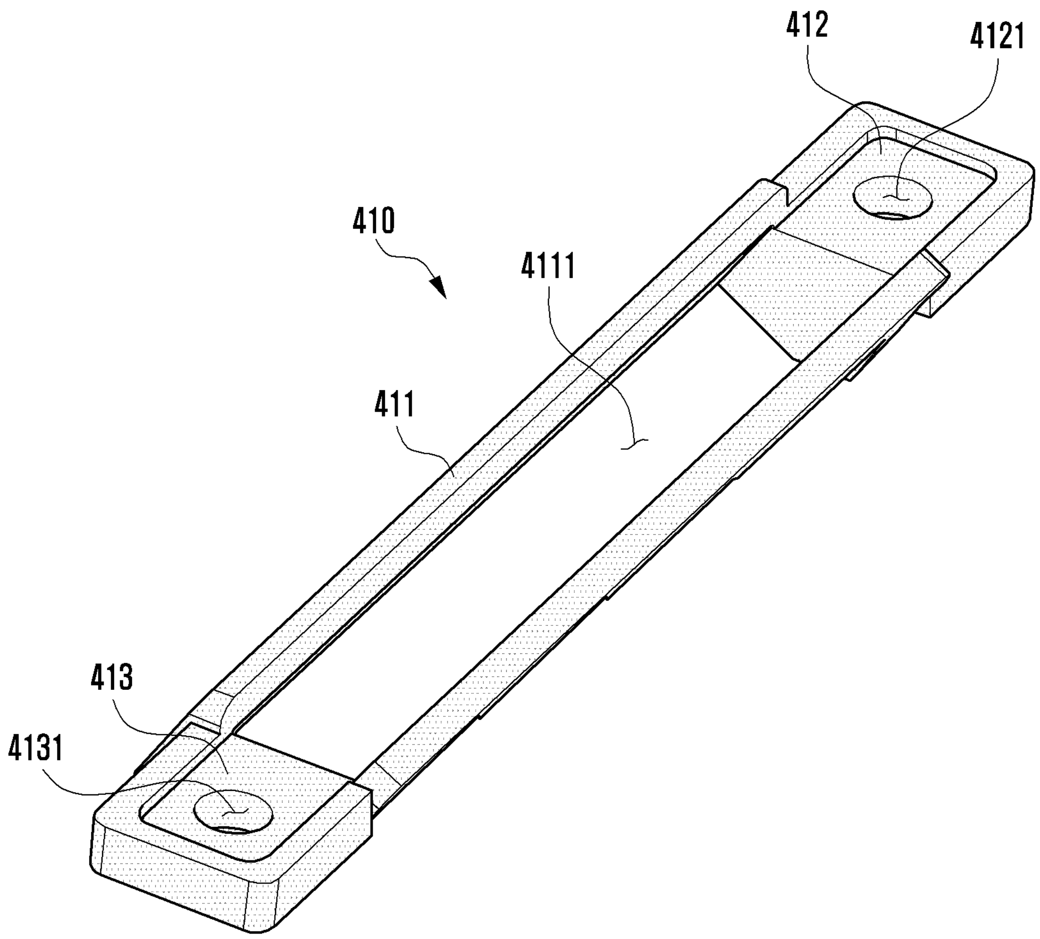
FIG. 6A is a perspective view of a mold bracket according to various embodiments of the disclosure.
Figure 6B:
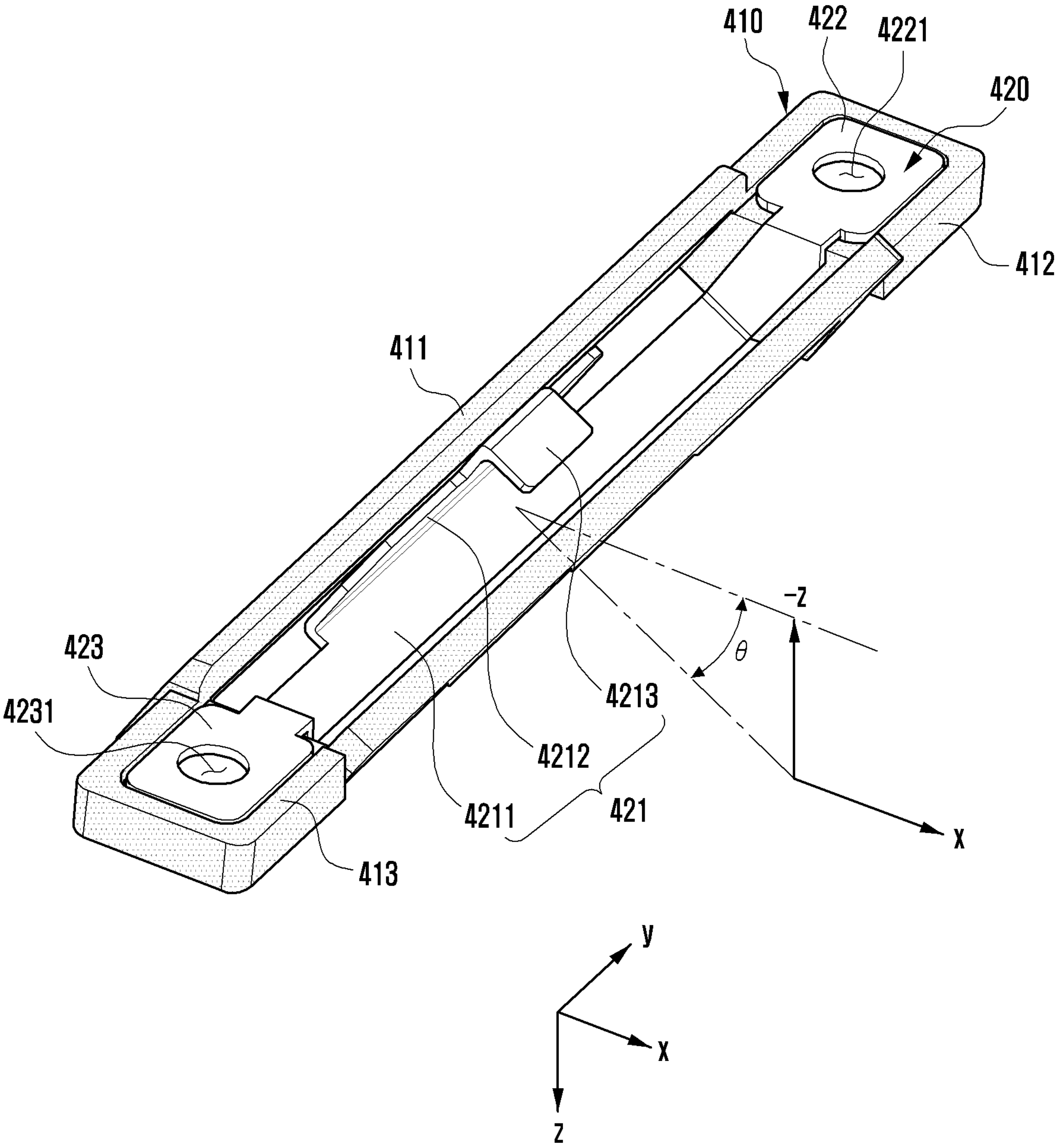
FIG. 6B is a perspective view illustrating a state in which a support bracket is mounted on the mold bracket according to various embodiments of the disclosure.
Figure 6C:
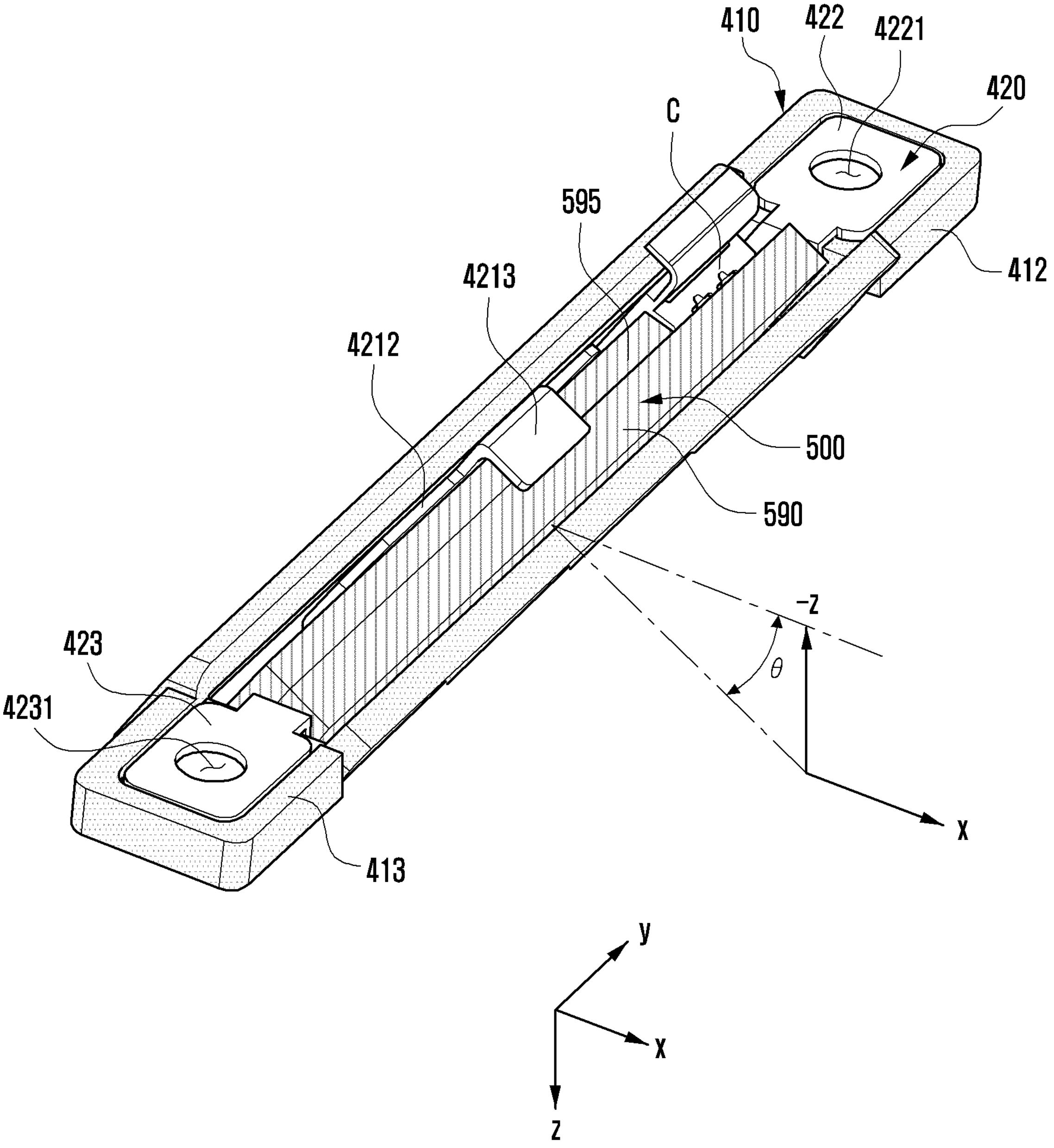
FIG. 6C is a perspective view illustrating a state in which an antenna structure is disposed on the support bracket mounted on the mold bracket according to various embodiments of the disclosure.

FIG. 6A is a perspective view of a mold bracket according to various embodiments of the disclosure. FIG. 6B is a perspective view illustrating a state in which a support bracket is mounted on the mold bracket according to various embodiments of the disclosure. FIG. 6C is a perspective view illustrating a state in which an antenna structure is disposed on the support bracket mounted on the mold bracket according to various embodiments of the disclosure.

Referring to FIGS. 6A to 6C, the electronic device (e.g., the electronic device 300 in FIG. 7) may include a mold bracket 410, a support bracket 420 supported by the mold bracket 410, and an antenna structure 500 including a substrate 590 fixed to the support bracket 420. According to an embodiment, the mold bracket 410 may include a bracket body 411 including a bracket accommodation hole 4111, a first fixing portion 412 extending to one end of the bracket body 411, and a second fixing portion 413 extending to the other end of the bracket body 411. According to an embodiment, the first fixing portion 412 and the second fixing portion 413 may include fastening holes 4121 and 4123 for screw fastening, respectively. According to an embodiment, the mold bracket 410 may be formed of a non-conductive material. According to an embodiment, the mold bracket 410 may be formed of a material such as PC, rubber, urethane, or silicone. In some embodiments, the mold bracket 410 may be formed of a metal material.

According to various embodiments, the support bracket 420 may be formed of a metal material. According to an embodiment, the support bracket 420 may be formed of a SUS-based metal material, also referred to as a stainless steel-based material. According to an embodiment, the support bracket 420 includes a substrate support part 421 supporting the substrate 590 of the antenna structure 500, a first extension 422 extending from one end of the substrate support part 421, and a second extension 423 extending from the other end of the substrate support part 421. According to an embodiment, the support bracket 420 may be disposed to surround at least a portion of the wireless communication circuit 595 disposed on the second surface (e.g., the first surface 5901 in FIG. 5) of the substrate 590 and/or the side surfaces (e.g., the side surfaces 5903 in FIG. 5) of the substrate 590 via the substrate support part 421, thereby being helpful for the strong support and heat dissipation of the substrate 590. According to an embodiment, the substrate support part 421 is configured to support the antenna structure 500 at a tilted position and can support the substrate 590 in such a way that the first surface (e.g., the first surface 5901 in FIG. 5) used as a radiation surface facing the plurality antenna elements (e.g., the plurality of antenna elements 510, 520, 530, and 540 in FIG. 5) is opened. According to an embodiment, the substrate support part 421 is at least partially inserted into the bracket accommodation port 4111 in the mold bracket 410, the first extension 422 may be disposed at least partially face the first fixing portion 412, and the second extension 423 may be disposed to at least partially face the second fixing portion 413 of the mold bracket 410. According to an embodiment, the first extension 422 may include a fastening hole 4221 provided at a position corresponding to the fastening hole 4121 in the first fixing portion 412, and the second extension 423 may include a fastening hole 4231 provided at a position corresponding to the fastening hole 4131 in the second fixing portion 413. According to an embodiment, the substrate support part 421 may include: a first support portion 4211 that supports at least a portion of one side surface among the side surfaces (e.g., the side surfaces 5903 in FIG. 5) of the substrate 590; a second support portion 4212 that is bent from the first support portion 4211 and supports at least a portion of the second surface (e.g., the second surface 5902 in FIG. 5) of the substrate 590; and a third support portion 4213 that is bent from the second support portion 4212 and supports at least a portion of the other side surface opposite to the one side surface among the side surfaces (e.g., the side surfaces 5903 in FIG. 5) of the substrate 590. According to an embodiment, the substrate support part 421 may have a shape that determines the tilting angle θ of the substrate 590 of the antenna structure 500 accommodated therein. According to an embodiment, at least a portion of at least one of the first, second, and third support portions 4211, 4212, and 4213 accommodated in the mold bracket 410 may be disposed to be exposed to the outside from the mold bracket 410.

According to various embodiments, the support bracket 420 including the antenna structure 500 fixed via the substrate support part 421 may be coupled to the mold bracket 410 in such a way that the substrate support part 421 is accommodated in the bracket accommodation port 4111 in the mold bracket 410. In some embodiments, the mold bracket 410 and the support bracket 420 may be coupled through insert injection molding. In some embodiments, the mold bracket 410 and the support bracket 420 may be structurally coupled to each other. In some embodiments, the mold bracket 410 and the support bracket 420 are fixed to the housing (e.g., the housing 310 of FIG. 7) via a single fastening member (e.g., a screw) in a state of being temporarily assembled with each other. In some embodiments, the mold bracket 410 and the support bracket 420 may be coupled through taping, bonding, or fusion. According to an embodiment, the electronic device (e.g., the electronic device 300 in FIG. 3) may include a cable member C that electrically connects the substrate 590 of the antenna structure 500 and the device substrate (e.g., the device substrate 370 in FIG. 10). According to an embodiment, the cable member C may be disposed to be drawn out from the mold bracket 410. According to an embodiment, the cable member C may include at least one of a coaxial cable that transmits or receives an RF signal, a flexible printed circuit board (FPCB) that transmits or receives a digital signal, or a flexible RF cable (FRC).

FIG. 7 is a perspective view illustrating the state in which the mold bracket on which the support bracket including the antenna structure according to various embodiments of the disclosure is mounted is disposed in and partially coupled to a housing.

Referring to FIG. 7, an electronic device 300 may include a housing 310 (e.g., a housing structure) that includes: a first plate 311 oriented in a first direction (e.g., the z-axis direction); a second plate; a second plate (e.g., the second plate 312 in FIG. 4) oriented in a direction (e.g., the -z-axis direction) opposite to the first plate 311; and a side member (e.g., the side member 313 in FIG. 4) surrounding the inner space 3001 between the first plate 311 and the second plate 312 and oriented in a third direction (e.g., the x-axis direction) perpendicular to the first direction (e.g., the z-axis direction). According to an embodiment, the housing 310 may be formed of a non-conductive material (e.g., polymer).

According to various embodiments, the electronic device 300 may include an antenna structure 500 disposed to form a beam pattern at a predetermined angle θ on the inner surface 3111 of the first plate 311. According to an embodiment, the antenna structure 500 may be fixed to the inner surface 3111 of the first plate 311 via a support bracket 420 that fixes the substrate 590 and a mold bracket 410 that supports the support bracket 420. According to an embodiment, the first plate 311 may include a pair of fastening bushes 3111*a* protruding from the inner surface 3111 to the inner space 3001 to be spaced apart from each other. According to an embodiment, the antenna structure 500 may be fixed to the first plate 311 in the following manner a first fixing portion 412 and a first extension 422 and a second fixing portion 413 and a second extension 423 are disposed to face, respectively, the opposite ends of each of the support bracket 420 and the mold bracket 410, and screws S passing through fastening holes 4121 and 4221 provided in the first fixing portion 412 and the first extension 422 and fastening holes 4131 and 4231 provided in the second fixing portion 413 and the second extension 423 are fastened to a pair of bushes 3111*a*. In this case, the first fixing portion 412 and the first extension 422 and the second fixing portion 413 and the second extension 423 may face the pair of fastening bushes 311*a*, respectively, and the screws S may be fastened in a direction parallel to the first direction (e.g., the z-axis direction), for example, in a direction perpendicular to the inner surface 3111 of the first plate 311 (e.g., the z-axis direction), which may be helpful for the improvement of assemblability. This may be due to the fact that the substrate support part 421 of the support bracket 420 fixed to the mold bracket 410 preferentially supports the substrate 590 of the antenna structure 500 at a predetermined angle θ.

Figure 8:
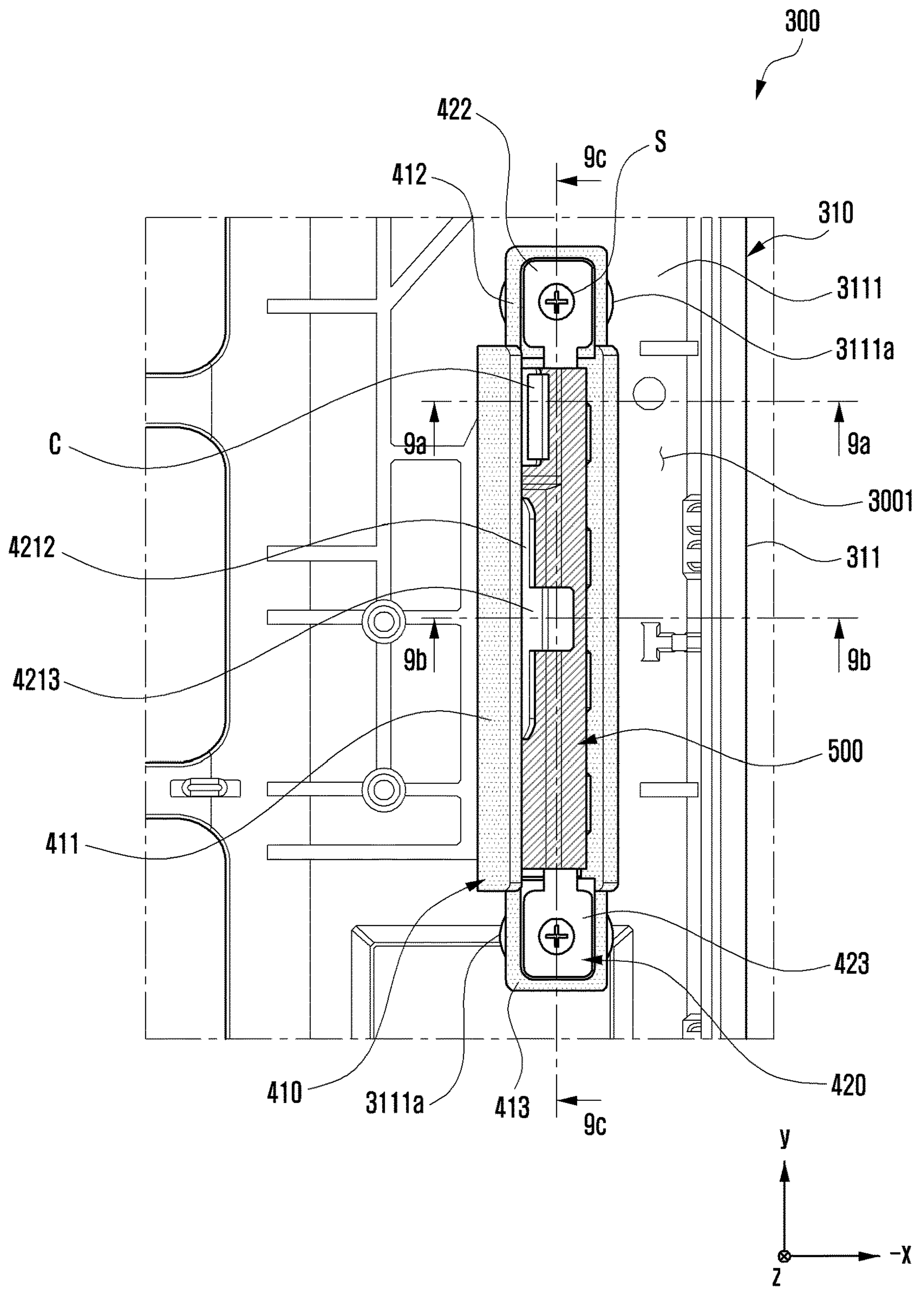
FIG. 8 is a plan view illustrating the state in which the mold bracket on which the support bracket including the antenna structure according to various embodiments of the disclosure is mounted is disposed in the housing.
Figure 9A:
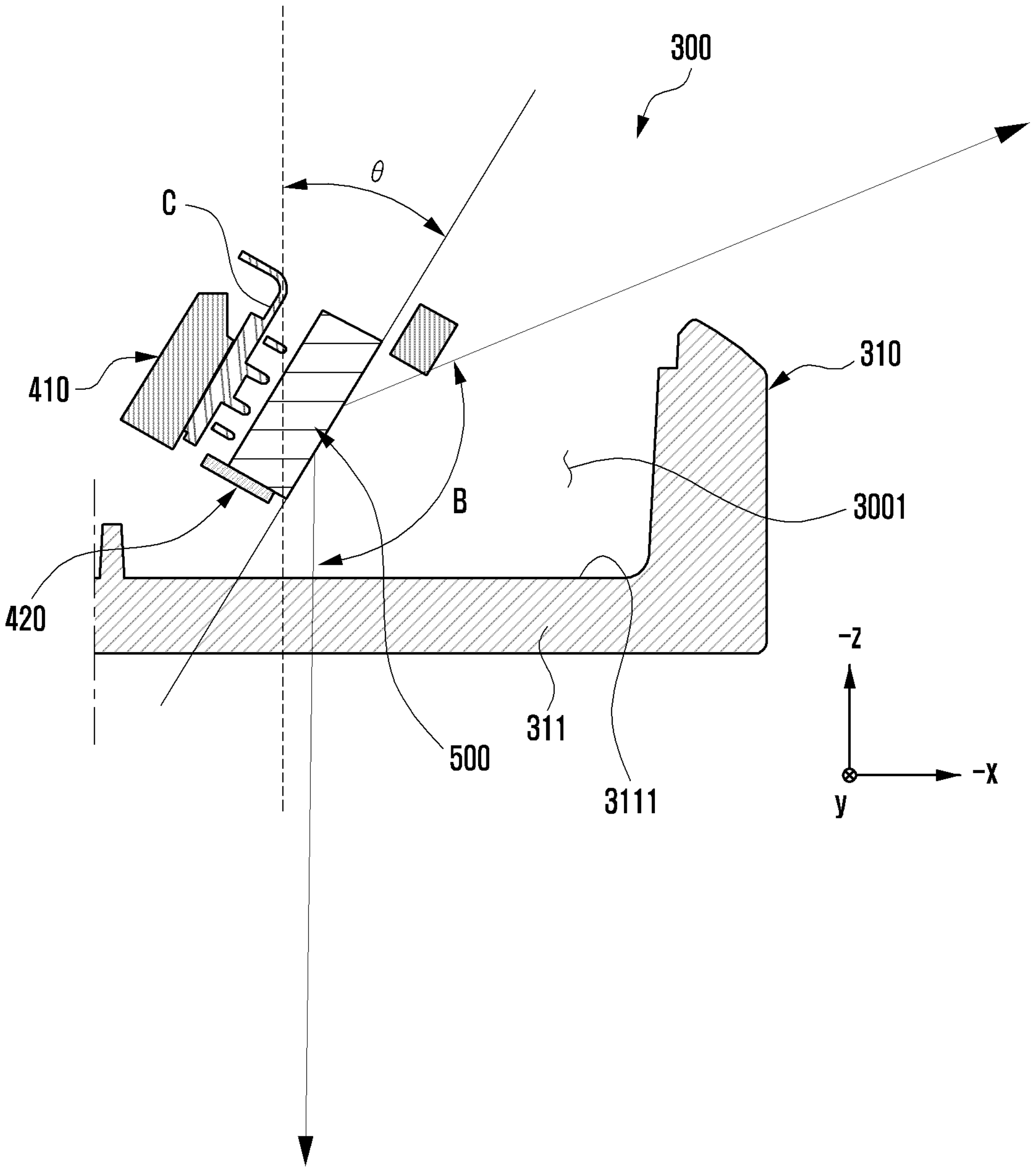
FIG. 9A is a partial cross-sectional view of the electronic device according to various embodiments of the disclosure taken along line 9*a*-9*a* in FIG. 8.
Figure 9B:
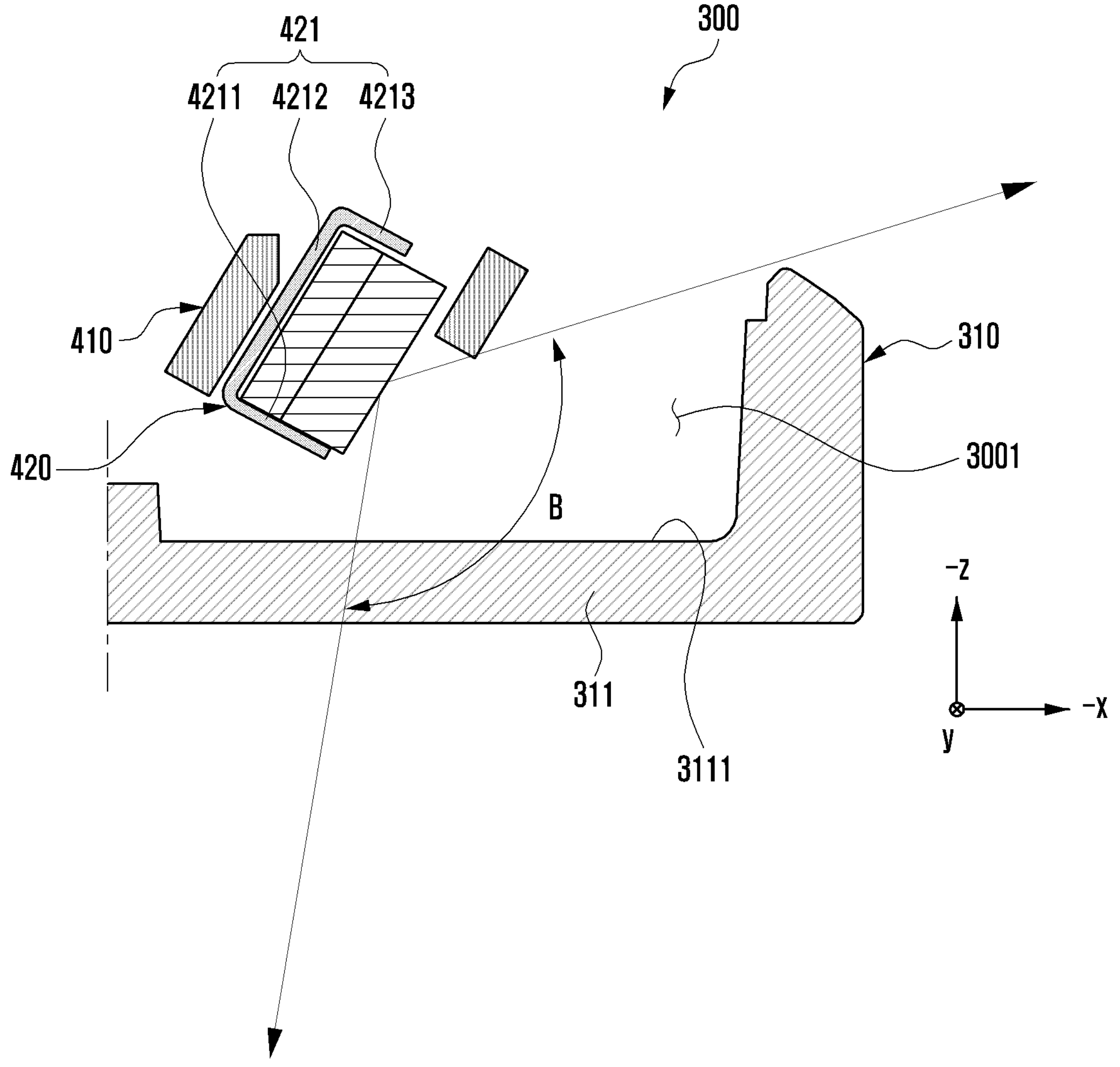
FIG. 9B is a partial cross-sectional view of the electronic device according to various embodiments taken along line 9*b*-9*b* in FIG. 8.
Figure 9C:
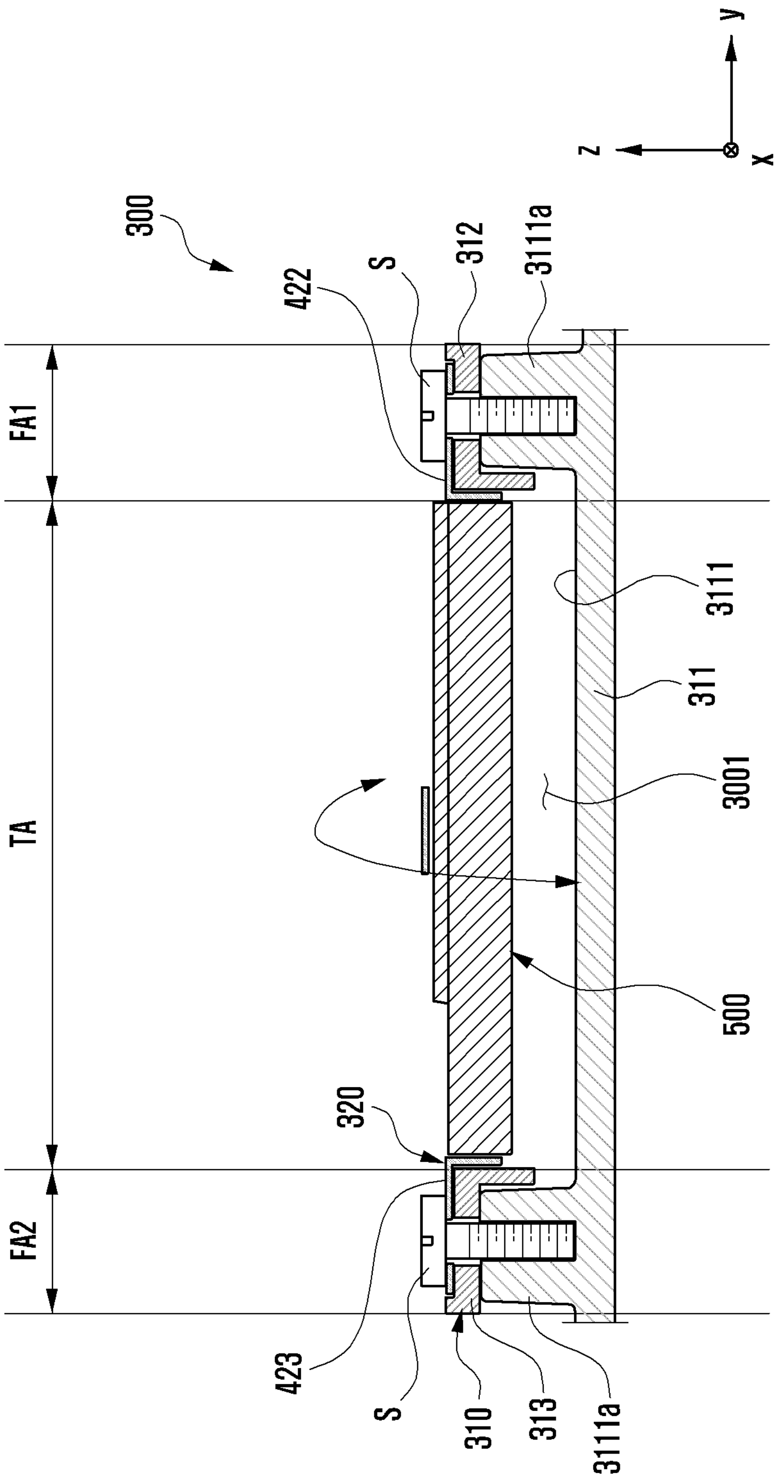
FIG. 9C is a partial cross-sectional view of the electronic device according to various embodiments taken along line 9*c*-9*c* in FIG. 8.

FIG. 8 is a plan view illustrating the state in which the mold bracket on which the support bracket including the antenna structure according to various embodiments of the disclosure is mounted is disposed in the housing. FIG. 9A is a partial cross-sectional view of the electronic device according to various embodiments of the disclosure taken along line 9*a*-9*a* in FIG. 8. FIG. 9B is a partial cross-sectional view of the electronic device according to various embodiments taken along line 9*b*-9*b* in FIG. 8. FIG. 9C is a partial cross-sectional view of the electronic device according to various embodiments taken along line 9*c*-9*c* in FIG. 8.

In describing the electronic device of FIG. 8 and FIGS. 9A to 9C, the same reference numerals are assigned to components substantially the same as those of the electronic device of FIG. 8, and a detailed description thereof may be omitted.

Referring to FIG. 8, the antenna structure 500 may be fixed to the first plate 311 in the following manner a first fixing portion 412 and a first extension 422 and a second fixing portion 413 and a second extension 423 are disposed to face, respectively, the opposite ends of each of the support bracket 420 and the mold bracket 410, and screws S passing through fastening holes 4121 and 4221 provided in the first fixing portion 412 and the first extension 422 and fastening holes 4131 and 4231 provided in the second fixing portion 413 and the second extension 423 are fastened to a pair of bushes 3111*a* protruding from the inner surface 3111 of the first plate 311. In some embodiments, the mold bracket 410 may be omitted. In this case, the antenna structure 500 may be fixed to the first plate 311 via screws S passing through the fastening holes 4221 and 4231 provided in the first extension 422 and the second extension 423 of the support bracket 420.

Referring to FIG. 9A, the antenna structure 500 may be fixed to the first plate 311 in the state of being tilted with a predetermined angle θ with respect to the first direction (e.g., the z-axis direction) via the mold bracket 410 and the support bracket 420. For example, the antenna structure 500 forms a main beam width B in the inner space 30001 of the electronic device 300 in the first direction (e.g., the z-axis direction) in which the first plate 311 is oriented and the third direction (e.g., the x-axis direction) perpendicular to the first direction (e.g., the z-axis direction), which may be helpful for the improvement of radiation performance of the antenna structure 500 through partial adjustment of the beam width B directed to the placement surface to the first direction (e.g., the z-axis direction).

Referring to FIG. 9B, the antenna structure 500 may be fixed to the first plate 311 in the state of being tilted with a predetermined angle θ with respect to the first direction (e.g., the z-axis direction) via the mold bracket 410 and the support bracket 420. In this case, in the antenna structure 500, various surfaces of the substrate (e.g., the substrate 590 in FIG. 5) are supported by the first, second, and third support portions 4211, 4212, and 4213 of the substrate support part 421 of the support bracket 420. Thus, it is possible to maintain the predetermined tilting angle θ of the antenna structure 500.

Referring to FIG. 9C, the antenna structure 500 may be fixed to the first plate 311 in the state of being tilted with a predetermined angle θ with respect to the first direction (e.g., the z-axis direction) via the mold bracket 410 and the support bracket 420. In this case, the antenna structure 500 may be fixed to the first plate 311 in the following manner a first fixing portion 412 and a first extension 422 and a second fixing portion 413 and a second extension 423 are disposed to face, respectively, the opposite ends of each of the support bracket 420 and the mold bracket 410, and screws S passing through fastening holes (e.g., the fastening holes 4121 and 4221 in FIGS. 6A and 6B) provided in the first fixing portion 412 and the first extension 422 and fastening holes (e.g., the fastening holes 4131 and 4231 in FIGS. 6A and 6B) provided in the second fixing portion 413 and the second extension 423 are fastened to a pair of bushes 3111*a* protruding from the inner surface 3111 of the first plate 311. According to an embodiment, heat generated from the antenna structure 500 may be transferred to the support bracket 420 formed of a conductive material. In some embodiments, between the substrate 590 of the antenna structure 500 and the support bracket 420, a heat transfer material (e.g., a thermal interface material (TIM)) is further disposed, which may be helpful for heat dissipation.

Figure 10:
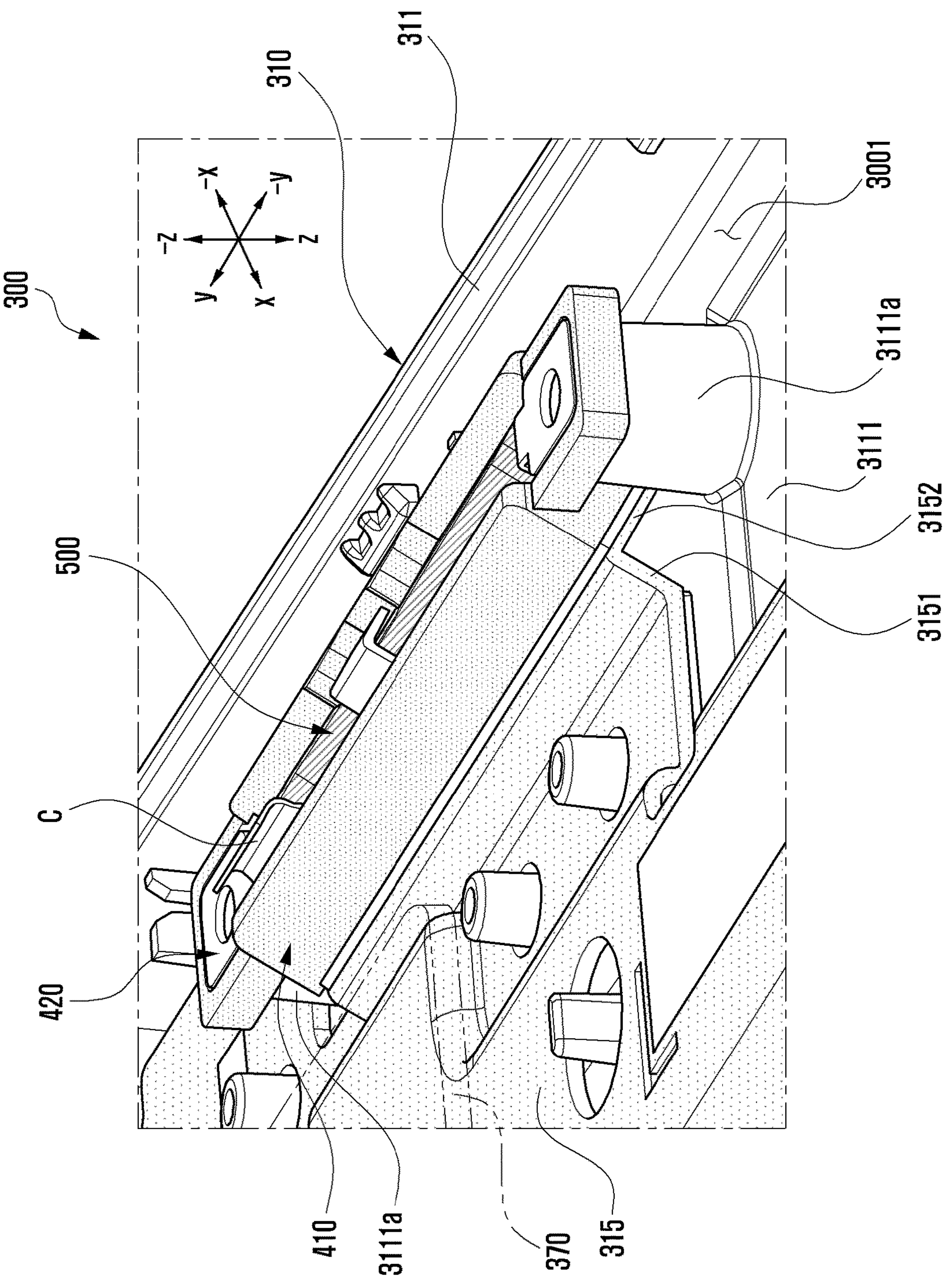
FIG. 10 is a perspective view illustrating a portion of the electronic device in which the mold bracket on which the support bracket including the antenna structure according to various embodiments of the disclosure is mounted is disposed in the housing via the support frame.

FIG. 10 is a perspective view illustrating a portion of the electronic device in which the mold bracket on which the support bracket including the antenna structure according to various embodiments of the disclosure is mounted is disposed in the housing via the support frame.

In describing the electronic device of FIG. 10, the same reference numerals are assigned to components substantially the same as those of the electronic device 300 of FIG. 8, and a detailed description thereof may be omitted.

Referring to FIG. 10, the antenna structure 500 may be fixed to the first plate 311 in the following manner a first fixing portion 412 and a first extension 422 and a second fixing portion 413 and a second extension 423 are disposed to face, respectively, the opposite ends of each of the support bracket 420 and the mold bracket 410, and screws S passing through fastening holes 4121 and 4221 provided in the first fixing portion 412 and the first extension 422 and fastening holes 4131 and 4231 provided in the second fixing portion 413 and the second extension 423 are fastened to a pair of bushes 3111*a* protruding from the inner surface 3111 of the first plate 311. According to an embodiment, the antenna structure 500 may be fixed to the first plate 311 to be tilled to the space between the first direction (e.g., the z-axis direction) and the third direction (e.g., the x-axis direction) via the support bracket 420 and the mold bracket 410.

According to various embodiments, the electronic device 300 may include a plate-shaped support frame 315 disposed to face the inner surface 3111 of the first plate 311 in the inner space 3001. According to an embodiment, the support frame 315 may be made of a metal material (e.g., SUS). According to an embodiment, the support frame 315 may be disposed to support the key button assembly (e.g., the key button assembly 340 in FIG. 3) in the inner space 3001 of the electronic device 300. According to an embodiment, at least a portion of the support frame 315 may include a support structure for supporting at least a portion of the mold bracket 410 and/or the support bracket 420 disposed in a tilted state on the first plate 311. For example, the support frame 315 may include a first bent portion 3151 bent from at least a partial area to the inner space 3001 and a second bent portion 3152 bent from the first bent portion 3151 to support the mold bracket 410 and/or the support bracket 420. According to an embodiment, the second bent portion 3152 may be disposed to be in contact with at least a portion of the mold bracket 410. In some embodiments, the second bent portion 3152 may be disposed to be in contact with at least a portion of the support bracket 420. In this case, heat generated from the antenna structure 500 is transferrable to the support frame 315 via the support bracket 420 and the second bent portion 3152, which may be helpful for heat dissipation. In some embodiments, between the support bracket 420 and the second bent portion 3152, a heat transfer material (TIM) may be further disposed.

According to various embodiments, when the antenna structure 500 is disposed on the first plate 311 and the device substrate (e.g., the main board) is disposed on the second plate (e.g., the second plate 312 of FIG. 4), electrical connection between the antenna structure 500 and the device substrate may be difficult. According to an exemplary embodiment of the disclosure, the electronic device 300 may include a device substrate 370 (e.g., a main board) disposed on the inner surface 3111 of the first plate 311. According to an embodiment, the device substrate 370 is disposed near the mold bracket 410 and/or the support bracket 420 in the inner space 3001 of the electronic device 300, so that the cable member C drawn out from the antenna structure 500 may be easily electrically connected to the device substrate 370. For example, the electronic device 300 may have an arrangement structure in which the antenna structure 500 and the device substrate 370 are disposed together on the same first plate 311, which may be helpful for the improvement of assemblability.

Figure 11A:
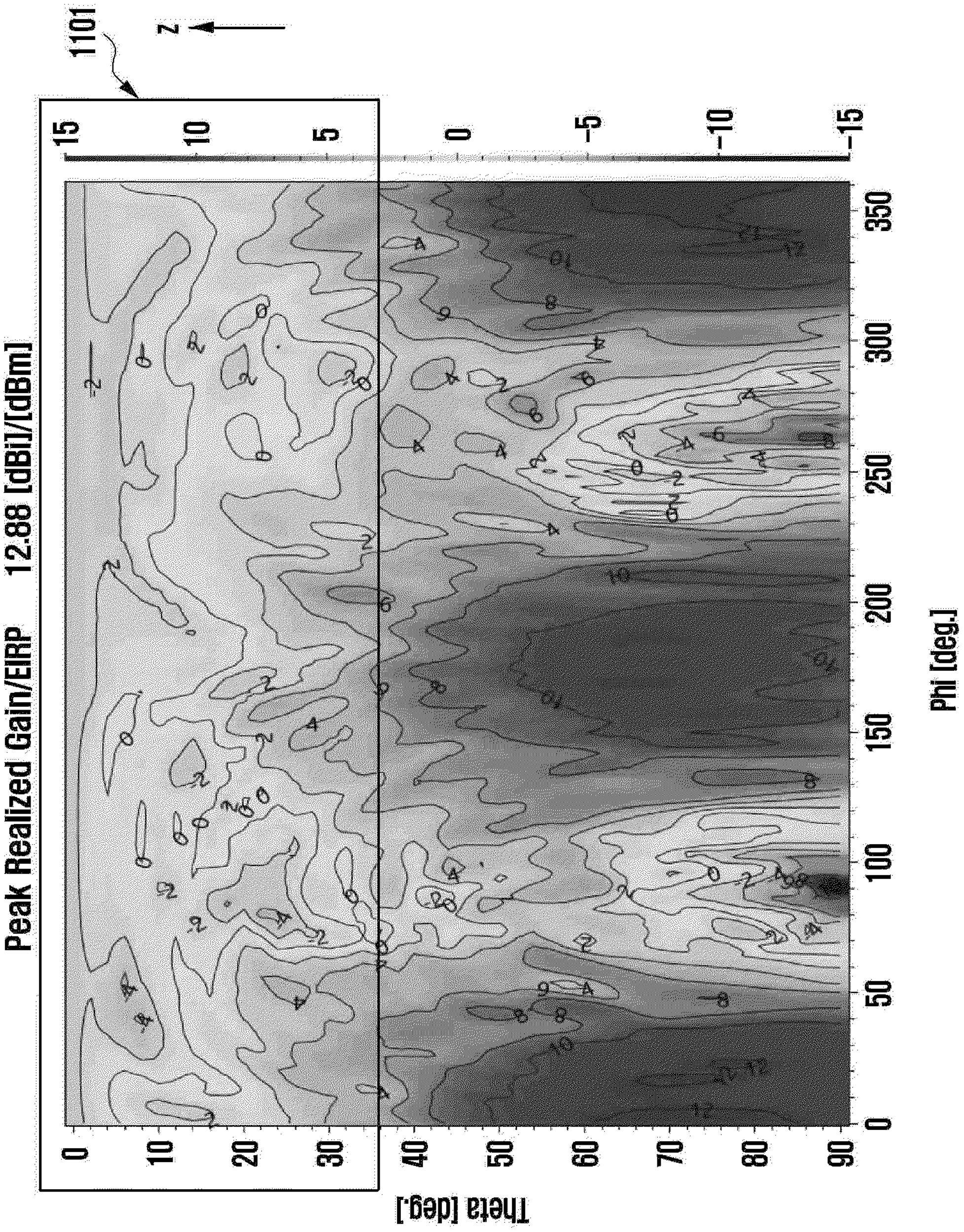
FIGS. 11A and 11B are diagrams comparing current distributions in the antenna structure according to various embodiments of the disclosure before and after tilting.
Figure 11B:
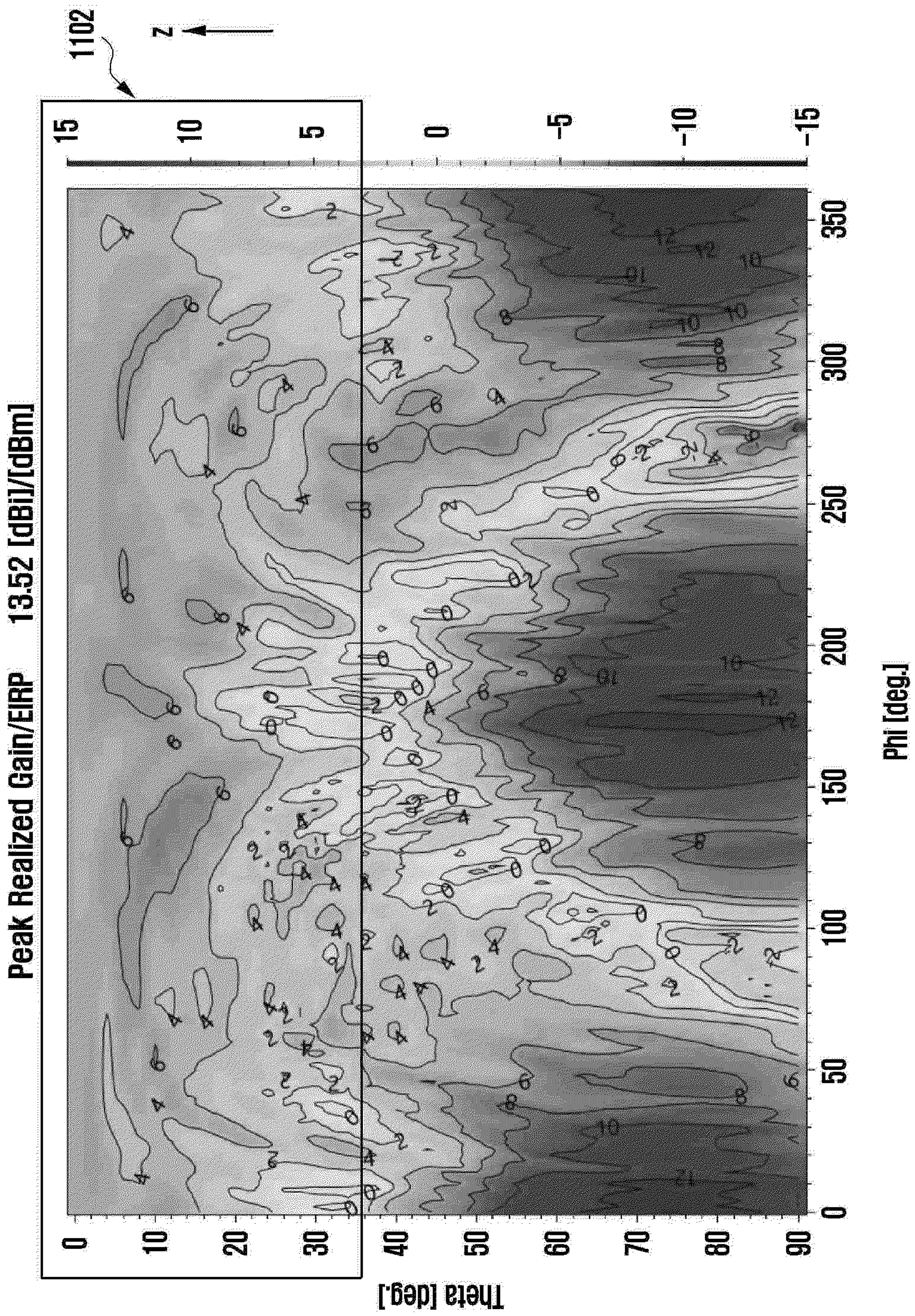

FIGS. 11A and 11B are diagrams comparing current distributions in the antenna structure according to various embodiments of the disclosure before and after tilting.

FIG. 11A shows a current distribution in an antenna structure (e.g., antenna structure 500) which is mounted in the inner space of the electronic device 300 such that the radiation surface (e.g., vertical mounting) (e.g., the first surface 5901 in FIG. 5) is oriented in the third direction (the x-axis direction in FIG. 4) (area 1101 in FIG. 11A), and FIG. 11B shows a current distribution in an antenna structure 500 which is tilted such that the radiation surface (e.g., the first surface 5901 in FIG. 5) face the space between the first direction (e.g., the z-axis direction) and the third direction (e.g., the x-axis direction in FIG. 4) (area 1102 in FIG. 11B).

As shown, it can be seen that the current distribution in the first direction (e.g., the z-axis direction) formed via the tilted antenna structure 500 in FIG. 11B is more improved than the current distribution formed via the antenna structure in FIG. 11A. This may mean that the radiation performance is improved as the beam width is changed in the first direction (z-axis direction) opposite to the placement surface (e.g., the placement surface T in FIG. 4) when the antenna structure 500 is tilted.

According to various embodiments, an electronic device (e.g., the electronic device 300 in FIG. 7) may include: a housing (e.g., the housing 310 in FIG. 7); an antenna structure (e.g., the antenna structure 500 in FIG. 7) disposed in the inner space of the housing and including a substrate (e.g., the substrate 590 in FIG. 5), the antenna structure including a first surface (e.g., the first surface 5901 in FIG. 5), a second surface (e.g., the second surface 5902 in FIG. 5) facing away from the first surface, and a side surface (e.g., the side surface 5903 of FIG. 5) surrounding the space between the first surface and the second surface, and at least one antenna element (e.g., the antenna elements 510, 520, 530, and 540 in FIG. 5) disposed on the substrate to form a beam pattern in a direction in which the first surface is oriented; at least one bracket (e.g., the mold bracket 410 and the support bracket 420 in FIG. 7) disposed in the inner space and configured to support the substrate such that the first surface is tilted to a predetermined angle (e.g., the tilting angle θ in FIG. 7) with respect to a first direction; and a wireless communication circuit (e.g., the wireless communication circuit 595 in FIG. 5) disposed in the inner space and configured to form the beam pattern in the direction in which the first surface is oriented via the at least one antenna element.

According to various embodiment, the substrate may be disposed such that the first surface is oriented in a direction between the first direction and a second direction perpendicular to the first direction.

According to various embodiment, the at least one bracket may include a support bracket formed of a conductive material.

According to various embodiments, the support bracket may include a substrate support part configured to support the substrate to be tilted to the predetermined angle, a first extension extending from one end of the substrate support part, and a second extension extending from another end of the substrate support part, and the support bracket may be fixed to the inner space via the first extension and the second extension.

According to various embodiment, the electronic device may further include a pair of fastening bushes protruding from an inner surface of the housing toward the inner space and spaced apart from each other, wherein the first extension and the second extension may be fixed to the pair of fastening bushes via a fastening member.

According to various embodiment, the fastening direction of the fastening member may be parallel to the first direction.

According to various embodiment, the fastening member may include a screw passing through the first extension and the second extension and fastened to the pair of fastening bushes.

According to various embodiments, the substrate support part may include a first support portion configured to support at least a portion of one surface among the side surfaces of the substrate, a second support portion bent from the first support portion and configured to support at least a portion of the second surface of the substrate, and a third support portion bent from the second support portion and configured to support at least a portion of another side surface, which is opposite to the one side surface, among the side surfaces of the substrate.

According to various embodiment, the electronic device may further include a conductive support frame disposed in the inner space, wherein at least a portion of the conductive support frame may be disposed between the substrate support part and the housing to be in contact with the substrate support part and the housing.

According to various embodiment, heat generated from the antenna structure may be transferred to the conductive support frame via the support bracket.

According to various embodiment, the electronic device may further include a mold bracket disposed between the support bracket and the housing.

According to various embodiments, the mold bracket may include a bracket body including a bracket accommodation hole configured to accommodate at least a portion of the substrate support part, a first fixing portion extending from one end of the bracket body and supporting the first extension, and a second fixing portion extending from another end of the bracket body and supporting the second extension.

According to various embodiments, the first extension and the first fixing portion, and the second extension and the second fixing portion may be simultaneously fastened to the housing via single fastening members, respectively.

According to various embodiment, the support bracket may be coupled to the mold bracket through insert injection or structurally coupled to the mold bracket.

According to various embodiments, the wireless communication circuit may be configured to transmit or receive a wireless signal ranging from 3 GHz to 300 GHz via the at least one antenna element.

According to various embodiments, the electronic device may further include a device substrate disposed in the inner space and connected to the substrate via an electrical connection member, wherein the device substrate may be disposed on a same surface as the surface to which the support bracket is fixed in the housing.

According to various embodiments, an electronic device (e.g., the electronic device 300 in FIG. 7) may include: a housing (e.g., the housing 310 in FIG. 7) including a first plate (e.g., the first plate 311 in FIG. 7) oriented in a first direction (e.g., the z-axis direction in FIG. 7), a second plate (e.g., the second plate 312 in FIG. 4) oriented in a second direction (e.g., the −z axis direction in FIG. 7) opposite to the first plate, and a side member (e.g., the side member 313 in FIG. 4) surrounding the inner space (e.g., the inner space 3001 in FIG. 7) between the first plate and the second plate and oriented in a third direction (e.g., the x-axis direction in FIG. 7) perpendicular to the first direction; an antenna structure (e.g., the antenna structure 500 in FIG. 7) disposed in the inner space and including a substrate (e.g., the substrate 590 in FIG. 5) including a first surface (e.g., the first surface 5901 in FIG. 5), a second surface (e.g., the second surface 5902 in FIG. 5) facing away from the first surface, and a side surface (e.g., the side surface 5903 in FIG. 5) surrounding the space between the first surface and the second surface, and at least one antenna element (e.g., the antenna elements 510, 520, 530, and 540 of FIG. 5) disposed to form a beam pattern in a direction in which the first surface is oriented; a conductive support bracket (e.g., the support bracket 420 of FIG. 7) disposed in the inner space via the first plate and configured to support the substrate such that the first surface is tilted to a predetermined angle between the first direction and the third direction; a mold bracket (e.g., the mold bracket 410 in FIG. 7) disposed between the conductive support bracket and the first plate and configured to fix the conductive support bracket; and a wireless communication circuit (e.g., the wireless communication circuit 595 of FIG. 5) disposed in the inner space and configured to transmit or receive a wireless signal of a predetermined frequency band via the at least one antenna element.

According to various embodiment, the conductive support bracket and the mold bracket may be simultaneously fastened to the first plate via a single fastening member.

According to various embodiment, the electronic device may further include a conductive support frame disposed on the first plate, wherein at least a portion of the conductive support frame is disposed to be in contact with at least a portion of the conductive support bracket, and heat generated from the antenna structure may be transferred to the conductive support frame via the conductive support bracket.

According to various embodiment, the support bracket may be coupled to the mold bracket through insert injection or structurally coupled to the mold bracket.

The embodiments of the disclosure disclosed in this specification and drawings are provided merely to propose specific examples in order to easily describe the technical features according to the embodiments of the disclosure and to help understanding of the embodiments of the disclosure, and are not intended to limit the scope of the embodiments of the disclosure. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

The invention claimed is:

1. An electronic device comprising:

a housing;

an antenna structure disposed in an inner space of the housing, the antenna structure comprising:

a substrate including a first surface, a second surface facing away from the first surface, and side surfaces surrounding a space between the first surface and the second surface, and at least one antenna element disposed on the substrate and configured to form a beam pattern in a direction in which the first surface is oriented;

support bracket disposed in the inner space and configured to support the substrate such that the first surface is tilted to a predetermined angle with respect to a first direction and formed of a conductive material, the support bracket comprising:

a substrate support part configured to support the substrate to be tilted to the predetermined angle;

a first extension extending from one end of the substrate support part; and a second extension extending from another end of the substrate support part;

a mold bracket disposed between the support bracket and the housing, the mold bracket comprising:

a bracket body including a bracket accommodation hole configured to accommodate at least a portion of the substrate support part;

a first fixing portion extending from one end of the bracket body and supporting the first extension; and a second fixing portion extending from another end of the bracket body and supporting the second extension; and a wireless communication circuit disposed in the inner space and configured to form, via the at least one antenna element, the beam pattern in the direction in which the first surface is oriented, wherein the support bracket is fixed to the inner space via the first extension and the second extension.

2. The electronic device of claim 1, wherein the substrate is disposed such that the first surface is oriented in a direction between the first direction and a second direction perpendicular to the first direction.

3. The electronic device of claim 1, further comprising a pair of fastening bushes protruding from an inner surface of the housing toward the inner space and spaced apart from each other, wherein the first extension and the second extension are fixed to the pair of fastening bushes via a fastening member.

4. The electronic device of claim 3, wherein a fastening direction of the fastening member is parallel to the first direction.

5. The electronic device of claim 3, wherein the fastening member comprises a screw passing through the first extension and the second extension and fastened to the pair of fastening bushes.

6. The electronic device of claim 1, wherein the substrate support part comprises:

a first support portion configured to support at least a portion of one surface among the side surfaces of the substrate;

a second support portion bent from the first support portion and configured to support at least a portion of the second surface of the substrate; and a third support portion bent from the second support portion and configured to support at least a portion of another side surface, which is opposite to one side surface, among the side surfaces of the substrate.

7. The electronic device of claim 1, further comprising a conductive support frame disposed in the inner space, wherein at least a portion of the conductive support frame is disposed between the substrate support part and the housing to be in contact with the substrate support part and the housing.

8. The electronic device of claim 7, wherein heat generated from the antenna structure is transferred to the conductive support frame via the support bracket.

9. The electronic device of claim 1, wherein the first extension and the first fixing portion, and the second extension and the second fixing portion are simultaneously fastened to the housing via single fastening members, respectively.

10. The electronic device of claim 1, wherein the support bracket is coupled to the mold bracket through insert injection or structurally coupled to the mold bracket.

11. The electronic device of claim 1, wherein the wireless communication circuit is configured to transmit or receive a wireless signal ranging from 3 GHz to 300 GHz via the at least one antenna element.

12. The electronic device of claim 1, further comprising a device substrate disposed in the inner space and connected to the substrate via an electrical connection member, wherein the device substrate is disposed on a same surface as the surface to which the support bracket is fixed in the housing.

13. An electronic device comprising:

a housing including a first plate oriented in a first direction, a second plate oriented in a second direction opposite to the first plate, and a side member surrounding an inner space between the first plate and the second plate and oriented in a third direction perpendicular to the first direction;

an antenna structure disposed in the inner space, the antenna structure comprising:

a substrate including a first surface, a second surface facing away from the first surface, and a side surface surrounding the space between the first surface and the second surface, and at least one antenna element disposed to form a beam pattern in a direction in which the first surface is oriented;

a conductive support bracket disposed in the inner space via the first plate and configured to support the substrate such that the first surface is tilted to a predetermined angle between the first direction and the third direction, the support bracket comprising:

a substrate support part configured to support the substrate to be tilted to the predetermined angle;

a first extension extending from one end of the substrate support part; and a second extension extending from another end of the substrate support part;

a mold bracket disposed between the conductive support bracket and the first plate and configured to fix the conductive support bracket, the mold bracket comprising:

a bracket body including a bracket accommodation hole configured to accommodate at least a portion of the substrate support part;

a first fixing portion extending from one end of the bracket body and supporting the first extension; and a second fixing portion extending from another end of the bracket body and supporting the second extension; and a wireless communication circuit disposed in the inner space and configured to transmit or receive, via the at least one antenna element, a wireless signal of a predetermined frequency band, wherein the support bracket is fixed to the inner space via the first extension and the second extension.

14. The electronic device of claim 13, wherein the conductive support bracket and the mold bracket are simultaneously fastened to the first plate via a single fastening member.

15. The electronic device of claim 13, further comprising a conductive support frame disposed on the first plate, wherein at least a portion of the conductive support frame is disposed to be in contact with at least a portion of the conductive support bracket, and wherein heat generated from the antenna structure is transferred to the conductive support frame via the conductive support bracket.

16. The electronic device of claim 13, wherein the support bracket is coupled to the mold bracket through insert injection or structurally coupled to the mold bracket.

* * * * *